Oct. 12, 1965　　　E. PROJAHN　　　3,211,194

FILLING VALVE

Filed May 1, 1963

INVENTOR:
Emil Projahn
By

United States Patent Office 3,211,194
Patented Oct. 12, 1965

3,211,194
FILLING VALVE
Emil Projahn, Nurnberg, Germany, assignor to Gebruder
Kollisch, Nurnberg, Germany
Filed May 1, 1963, Ser. No. 277,157
Claims priority, application Germany, July 26, 1962,
K 47,342
4 Claims. (Cl. 141—295)

The present invention relates to a filling valve for a fuel reservoir of a gas lighter, for instance a pocket gas lighter, with spring-biased valve shank, in which said shank is by a collar in a valve holder guided with slight play while the lower end of said shank is designed as closure body cooperating with a seal in said valve holder.

Filling valves are known which comprise two seals in the valve holder, viz. an upper seal and a lower seal, while the upper seal consists of unilaterally effective osmotic material. Such valve is described in Patent 3,019,807.

It is an object of the present invention to provide a filling valve of the general type mentioned above in which the upper seal will become superfluous.

It is another object of this invention to provide a filling valve for lighters as, for instance pocket lighters, in which the gas loss during the filling of the fluid reservoir will be reduced to a minimum.

These and other objects and advantages of the invention will appear more clearly from the following specification in connection with the accompanying drawing, in which.

Figure 1:
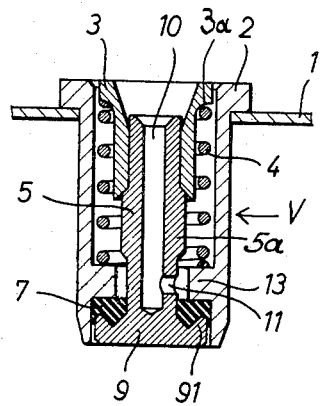
FIGURE 1 illustrates in section a valve according to the present invention in closed condition.

The present invention is characterized primarily in that the valve shank at the level of the collar has a reduced diameter less than the diameter confined by said collar, while the longitudinal extension of the reduced diameter portion of said shank is longer than the thickness of said collar. Furthermore according to the present invention, the valve shank has connected thereto a closure member for cooperation with the seal while that face of said closure member which faces said seal is provided with an annular groove for receiving a portion of said seal when the latter is fully engaged by said closure member.

Referring now to the drawing in detail, the structure shown therein comprises a fluid reservoir 1 having mounted thereon a filling valve generally designated "V." Valve V comprises a holding body 2 confining a valve nipple 3 and a valve spring 4 interposed between a collar 13 of the holding body 2 and a flange 3a of the valve nipple 3. As will be seen from the drawing, the outer periphery of flange 3a confines with the holding body 2 a passage 53. The arrangement furthermore comprises a valve shank 5 connected to valve nipple 3 in any convenient manner, for instance, by a press-fit or by a thread. Valve shank 5 is provided with a longitudinal bore 10 closed at its lower end and open at its upper end. Near the closed end of bore 10 there is provided in said shank 5 a transverse bore 11. As will also be seen from FIG. 2 the outer diameter of the section 5a is less than the inner diameter of the collar 13 to such an extent that when the shank 5 occupies its FIG. 2 position or FIG. 3 position, there will be left between said shank and said collar 13 a passage 51 for a purpose which will be explained further below. Connected to the lower end of shank 5 is a head 9 for cooperation with a seal 7 arranged in a recess 2a of the holding body 2. Seal 7 is of elastic compressible material, for instance rubber, plastic, nylon.

Figure 2:
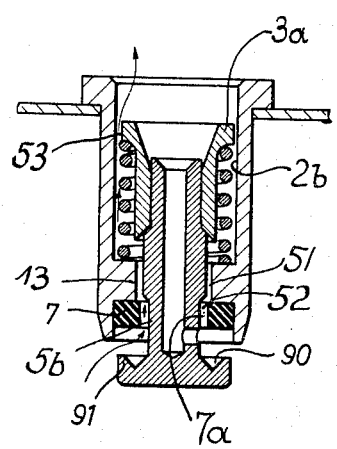
FIGURE 2 is a section of the valve of FIGURE 1 but in half-open position during a filling operation.
Figure 3:
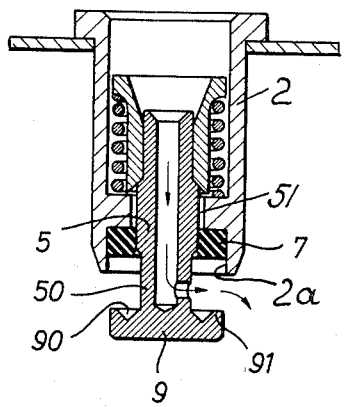
FIGURE 3 is a section similar to that of FIGURES 1 and 2 but showing the valve in completely opened position.

When seal 7 is not engaged by head 9, its inner surface 7a is disengaged from the outer periphery of the reduced shank portion 5b, so that an annular passage 52 will be confined between seal 7 and the reduced shank portion 5b in FIG. 2 position of the valve. In this instance, the passage 52 communicates with the passage 51 which, in its turn, through bore 2b of holding member 2 and through passage 53, communicates with the atmosphere.

Valve head 9 has that surface thereof which faces the seal 7 provided with a groove 90 for receiving a portion of seal 7 when the valve head is in its closing position, shown in FIG. 1. It will be seen from FIG. 1 that in the said closing position the marginal portion 91 of head 9 enters the seal 7 and displaces a portion thereof into the groove 90 and against the reduced shank section 5b thereby also establishing a sealing engagement of seal 7 with said reduced shank section 5b.

Operation

It may be assumed that the valve is in its closed position shown in FIG. 1, and has now to be filled. To this end the nipple of the filling bottle or vial is introduced into the nipple 3 and the valve shank 5 is depressed. When the valve shank, during its depression, has reached the second position of FIG. 2, communication is established between the interior of the reservoir 1 and the atmosphere through passages 52, 51 and 53. This communication permits air to escape from the reservoir so the reservoir is scavenged while filling gas commences to flow into the reservoir. When the valve shank 5 moves further downwardly past the second position and into its fully open position, shown in FIG. 3, the section 5a of the largest diameter of shank 5 enters the passage 52 and since the outer diameter of section 5a is somewhat greater than the inner diameter of the seal 7, compresses the latter slightly so as to establish a sealing engagement between the peripheral surface of section 5a and seal 7, as clearly shown in FIG. 3. In this way, while the gas can freely pass through bore 10 and bore 11 into the interior of reservoir 1, any escape of the gas through passage 51 is prevented. The gas losses during the filling of the reservoir will thus be reduced to a minimum.

It is, of course, to be understood that the present invention is, by no means, limited to the particular construction shown in the drawing, but also comprises any modification within the scope of the appended claims.

What I claim is:

1. In combination with a fluid reservoir of a lighter, especially pocket lighter, a valve structure comprising: a housing supported by said reservoir, control means reciprocably arranged within said housing and having first passage means therethrough for passing fluid from a supply source into said reservoir, said control means confining with said housing second passage means having an inlet for communication with said reservoir and having an outlet for communication with the atmosphere, and sealing means arranged in said housing and around said control means, said control means in a first position engaging said sealing means to close both said passage means and movable inwardly to a second position to disengage said sealing means and open both said passage means, said control means having a portion movable into engagement with said sealing means to close only said second passage means on further movement from said first position past said second position.

2. In combination with a fluid reservoir of a lighter, especially pocket lighter, a valve structure comprising: a housing supported by said reservoir, control means reciprocably arranged within said housing and having first passage means therethrough for passing fluid from a supply source into said reservoir, said control means confining with said housing second passage means having an inlet for communication with said reservoir and having an outlet for communication with the atmosphere, and sealing means arranged in said housing and around said control means, said control means having a first surface means operable in a first position to engage said sealing means and to cause the same sealingly to close both said first passage means and said second passage means with regard to the interior of said reservoir, said control means being movable inwardly to a second position to disengage said sealing means and open both said passage means, said control means having second surface means movable into engagement with said sealing means to close only said second passage means on further movement from said first position past said second position.

3. An arrangement according to claim 2, in which said first surface means faces said sealing means and is provided with groove means for receiving a portion of said sealing means when being in engagement therewith.

4. An arrangement according to claim 2, in which said sealing means forms a ring, and in which said control means has a shank with a first shank portion confining with the inner periphery of said ring a portion of said second passage means, said shank also having a second shank portion of larger outer diameter than said first shank portion and forming with a portion of said housing another part of said second passage means, the outer diameter of said second shank portion being slightly greater than the inner diameter of said ring and forming said second surface means movable into engagement with said sealing means.

References Cited by the Examiner
UNITED STATES PATENTS

| 2,769,325 | 11/56 | Storch | 141—349 X |
| 2,882,940 | 4/59 | Zellweger | 141—293 |
| 3,093,166 | 6/63 | Iketani | 141—293 |

FOREIGN PATENTS

| 655,196 | 1/63 | Canada. |
| 353,932 | 6/61 | Switzerland. |

LAVERNE D. GEIGER, *Primary Examiner.*